March 21, 1967 — R. J. DIEFENDORF — 3,310,375
METHOD OF FORMING A SHEET
Filed May 11, 1964
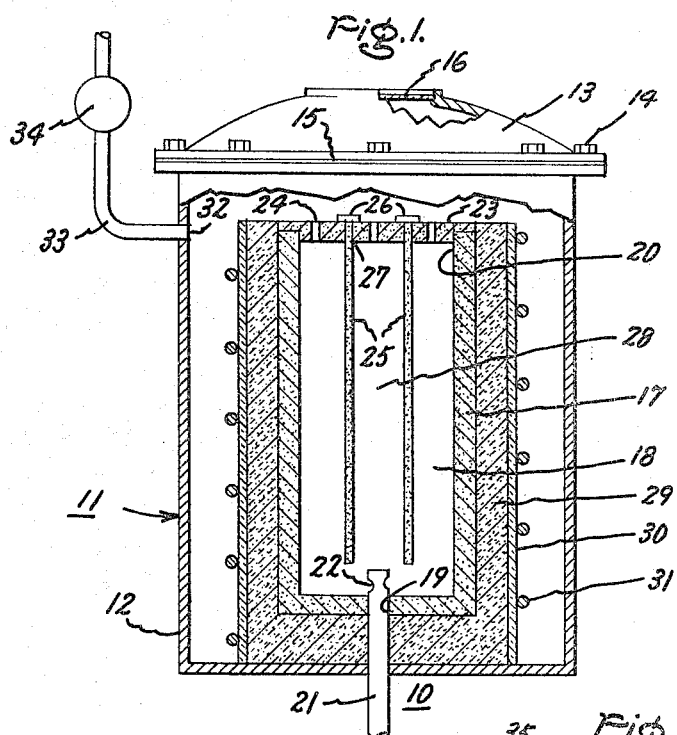
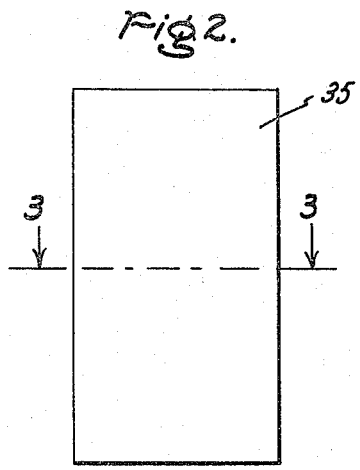
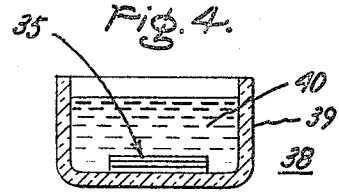
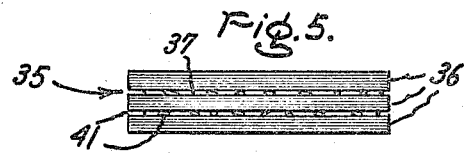
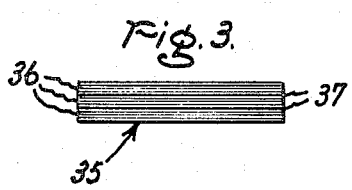
Inventor:
Russell J. Diefendorf,
by Paul R. Webb, II
His Attorney.

United States Patent Office 3,310,375
Patented Mar. 21, 1967

3,310,375
METHOD OF FORMING A SHEET
Russell J. Diefendorf, Ballston Spa, N.Y., assignor to General Electric Company, a corporation of New York
Filed May 11, 1964, Ser. No. 366,503
3 Claims. (Cl. 23—191)

This invention relates to methods of forming sheets and more particularly to methods of forming pyrolytic boron nitride sheets.

In my copending application, Ser. No. 245,879, filed Dec. 19, 1962, and assigned to the same assignee as the present application, there is disclosed and claimed methods of forming pyrolytic graphite sheets. The present application is directed to methods of forming pyrolytic boron nitride sheets.

Pyrolytic boron nitride is defined as a material made from gases by thermal decomposition or from materials formed by evaporation and deposition on a surface. In pyrolytic boron nitride, planar crystallites have a preferred orientation and are arranged so that their layers are generally parallel to the deposition surface. It would be desirable to provide sheets of pyrolytic boron nitride in varying thicknesses from bodies of such material. These sheets would have application as insulating elements, gas-impermeable membranes, and wrapping material.

It is extremely difficult to separate mechanically pyrolytic boron nitride material into uniform thin sheets. Furthermore, the thickness of any such separated sheets cannot be controlled accurately. Thus, it would be desirable to provide improved methods of forming pyrolytic boron nitride sheets in varying controlled thicknesses.

It is an object of my invention to provide an improved method of forming pyrolytic boron nitride sheets.

It is another object of my invention to provide an improved method of forming a body from which boron nitride layers are separated into sheets.

It is a further object of my invention to provide a method of forming boron nitride sheets of uniform thickness.

In carrying out my invention in one form, a method of forming a sheet comprises providing a body with a plurality of generally parallel pyrolytic boron nitride layers, and with an alternate layer with different properties between adjacent pyrolytic boron nitride layers, removing chemically the alternate layers, and separating the boron nitride layers into sheets.

These and various other objects, features, and advantages of the invention will be better understood from the following description taken in connection with the accompanying drawing in which:

FIGURE 1 is a sectional view of apparatus for forming a body in accordance with this invention;

FIGURE 2 is an elevational view of a body which was formed initially in the apparatus in FIGURE 1;

FIGURE 3 is a sectional view of the body shown in FIGURE 2 and taken on line 3—3 thereof;

FIGURE 4 is a sectional view of apparatus for contacting the body in FIGURE 2 with an intercalation material;

FIGURE 5 is a sectional view of the body partially separated into pyrolytic boron nitride sheets; and FIGURE 6 shows a plurality of pyrolytic boron nitride sheets separated from the body shown in FIGURE 5.

In FIGURE 1 of the drawing, apparatus is shown generally at 10 which comprises a chamber 11 having a lower body portion 12 and a cover 13 which is hinged to the lower body portion 12 by means of bolts 14 and employs an "O" ring 15 therebetween. Viewing window 16 is provided in cover portion 13 to view the operation and to read an optical pyrometer (not shown). An enclosure 17 of graphite or other high temperature material defines a chamber 18 communicating with a bottom opening 19 and a top opening 20. A feed line 21 is connected to material sources (not shown), for example, for boron, nitrogen and methane materials and extends therefrom through the bottom wall of body portion 12 and opening 19 in enclosure 17 to communicate with chamber 18 by means of outlet openings 22. Opening 20 of enclosure 17 is provided with a cover 23 having openings 24 therein for removal of fumes. Additional feed lines (not shown) may be employed and connected to separate material sources.

A pair of high temperature material plates, such as graphite plates 25, are hung within enclosure 17 by means of a flange 26 at one end of each plate 25. Each flange 26 is supported on cover 23 while its associated plate 25 extends through an opening 27 in cover 23 to be suspended within chamber 18 of enclosure 17. Passages 28 are defined by chamber 18 between adjacent plates 25 and between each plate 25 and its associated wall of enclosure 17. Suitable insulation such as carbon black 29 surrounds enclosure 17 and is held in position by a quartz or asbestos paper cylinder 30. Conventional induction heating coils 31 surround cylinder 29 to provide heat for enclosure 17, plates 25 and chamber 18 including passages 28 thereof during the deposition process. Body portion 12 of chamber 11 is also provided with an outlet 32 to which is connected a line 33 associated with a vacuum pump 34 to reduce the pressure in chamber 11.

In the operation of apparatus 10 shown in FIGURE 1, a pair of graphite plates 25 are supported within enclosures 17 by means of their respective flanges 26 on cover 23. In this manner, passages 28 are provided within chamber 18 between adjacent plates 25 and between each plate 25 and its associated wall of enclosure 17. Cover 13 is bolted to lower body portion 12 of chamber 11. The chamber atmosphere is reduced preferably to the lowest obtainable vacuum prior to admitting a gas, although the deposition process can be carried out over a wide range of chamber pressures such as 0.5 mm. to 760 mm. of mercury, at various gas flow rates.

In one method of forming bodies in accordance with the present invention on graphite plates 25, power is supplied to induction coil 31 to bring the temperature of enclosure 17, plates 25 and chamber 18 up to a temperature in the range of 1400° C. to 2000° C. prior to admitting a gas. A boron and nitrogen component gas, such as B-trichlorborazole, which has been heated to a temperature of 80° C., is fed through suitable metering devices (not shown) and feed line 21 with its associated outlet openings 22 into chamber 18 including passages 28. The gas is decomposed to a vapor which deposits as a pyrolytic boron nitride layer on both sides of plates 25 and on enclosure 17. This layer is composed of a plurality of individual generally parallel pyrolytic boron nitride layers. This temperature range and the above pressure range are desirable to produce individual fine-grained pyrolytic boron nitride layers. In addition to B-trichlorborazole, $B_3N_3H_3Cl_3$, which provides both the boron and nitrogen components, various starting materials such as $BCl_3$ or $B_2H_6$ are suitable to provide the boron component while $NH_3$ is suitable to provide the nitrogen component.

While induction coil 31 is used to heat the gas, enclosure 17, plates 25 and passages 28, the gas can be preheated from a separate heat source to the desired temperature to provide a vapor which flows through feed line 21 into chamber 18. During the operation of apparatus 10, temperatures are recorded by an optical pyrometer (not shown) which is viewed through window 16 in cover 13 of apparatus 10.

After a first layer of predetermined thickness of pyrolytic boron nitride composed of a plurality of individual layers thereof is deposited on both sides of plates 25, an alternate layer with different properties than the pyrolytic boron nitride layer, such as a pyrolytic carbonaceous material, is deposited on the pyrolytic boron nitride layer. The pyrolytic deposited carbonaceous materials include pyrolytic graphites and pyrolytic carbons which are decomposed from a carbonaceous material or gas under similar pressure and temperature conditions.

Prior to deposition of the alternate layer, for example of pyrolytic carbon, the supply of B-trichlorborazole through feed line 21 is discontinued. Methane gas is then supplied from a source through feed line 21 with outlet openings 22. The gas is decomposed to a vapor which deposits as a pyrolytic carbon layer on the boron nitride layer. Thus, advantage is secured by employing the same temperature and the same pressure in depositing a pyrolytic carbon.

The alternate layers, which have different properties than the pyrolytic boron nitride layer, are also selected from other materials such as various metals and aluminum nitride. If a layer of metal is employed as the alternate layer it is preferred to select a metal which is formed or is deposited on the boron nitride layer under similar pressure and temperature conditions. It is also desirable that such metal does not react with the boron nitride and can be removed chemically without adversely affecting the boron nitride layers. Thus, while the temperature and pressure conditions can be varied in the process to form the metal layers, it is desirable to select higher temperature metals such as molybdenum or tantalum for the alternate layer between the boron nitride layers. The alternate layer and its thickness are not critical since it is desired to form a plurality of pyrolytic boron nitride layers of uniform or of non-uniform thicknesses which will be separated subsequently into sheets.

After the deposition of the alternate layer of pyrolytic carbon the deposition process is returned to its initial conditions and another pyrolytic boron nitride layer is deposited on the alternate layer. The alternate layer depositions are continued to produce a body with a plurality of generally parallel pyrolytic boron nitride layers, and with an alternate layer of pyrolytic deposited carbon between adjacent pyrolytic boron nitride layers. Such a body is of a desired thickness such as in the order of 5 mils to 6 mils.

The gas supply and heating are discontinued, and apparatus 10 is allowed to cool to room temperature. The pressure is increased to atmospheric pressure and cover 13 is removed to provide access to enclosure 17. Plates 25 are removed from the enclosure by withdrawing the plates through the openings 27 in cover 23. The deposited body is then removed from each side of each of the plates 25.

In FIGURE 2 of the drawing, there is shown a deposited body 35 which was formed initially in the apparatus of FIGURE 1. In FIGURE 3 of the drawing, there is shown a sectional view of body 35 along line 3—3 in FIGURE 2. Each generally parallel pyrolytic boron nitride layer 36 is composed of a plurality of individual pyrolytic boron nitride layers. The alternate layers 37 with different properties, for example of pyrolytic carbon, are shown between adjacent layers 36. These layers 37 are deposited as described above.

In FIGURE 4 of the drawing, apparatus 38 is shown for removing chemically the alternate layers of pyrolytic deposited carbon. When a pyrolytic deposited carbonaceous material, such as pyrolytic graphite or pyrolytic carbon form the alternate layers these alternate layers are removed chemically by contacting body 35 with an intercalation material. Apparatus 38 includes a container 39, such as glass, with a solution 40 of an intercalation material, such as concentrated sulfuric acid with a small amount of $KClO_4$ or $HNO_3$. Body 35 is immersed in solution 40. I found unexpectedly that the intercalation material is inserted in or added to the alternate layers 37 of pyrolytic carbon when body 35 is contacted by, exposed to or immersed in such a material. I found further that such a material accepts or donates electrons from layers 37 thereby decreasing the strength of layers 37 and thus, decreasing the continuity between adjacent layers 36 resulting in partial or complete separation of layers 36.

An intercalation material is an element or compound in liquid or gaseous form which is an electron acceptor with high electron affinity or an electron donor with a low ionization potential. Such a material is inserted or added in a preferred manner to layers of one composition in a laminated body having layers of two different compositions. Such insertion or addition of this material is caused by the exposure, contact or immersion of a body with the material. The addition of the material in the particular layers of the body decreases the strength thereof, and thereby decreasing the continuity between adjacent other layers and causes partial or complete separation of the layers which do not include the material.

The amount of the material in liquid form in a liquid vehicle, its volume in gaseous form, or its concentration are not critical. The insertion in or addition of the intercalation material in particular layers of a laminated body is observed visually by a separation of the other layers or a change of color in the body, thus, the time of exposure, contact or immersion of the body with the material is not critical.

Various materials in liquid or gaseous form are suitable for employment as the intercalation material in the practice of the present invention when the alternate layers are pyrolytic deposited carbonaceous material. Examples of intercalation material which are suitable for this process are as the following:

$H_2SO_4$ + small amount of $HNO_3$ or $KClO_4$, $AlCl_3$, $BCl_3$, K, Co, ICl, $ICl_3$, $Br_2$, AlCl and $FeCl_3$.

Apparatus 38 in FIGURE 4 is also employed to remove chemically alternate layers of materials other than pyrolytic deposited carbonaceous material. Such chemical removal is accomplished by dissolving chemically the alternate layers. For example, if molybdenum is employed for the alternate layers, hot $H_2SO_4$ with a small amount of $HNO_3$ or $KClO_4$ is used in container 39, in which body 35 is immersed, to dissolve chemically the molybdenum. Similarly, tantalum alternate layers are dissolved chemically by HF. If aluminum nitride alternate layers are employed, KOH or NaOH is used to dissolve these layers.

In FIGURE 5, body 35 is shown removed from apparatus 38. It includes a plurality of pyrolytic boron nitride layers 36 with portions of pyrolytic deposited carbon layers 37 between adjacent layers 36. Areas 41 are separations between adjacent layers 36. Body 35 is washed with distilled water or heated at a temperature in the range of 300° C. to 1500° C. to break down or remove the remaining portions of layers 37. If desired, layers 36 can be separated into sheets after which they are washed with distilled water.

In FIGURE 6, there is shown a plurality of pyrolytic boron nitride sheets. These sheets 42 are formed from layers 36. These sheets are shown of uniform thickness although non-uniform sheets can also be formed as described above.

Examples of methods of forming a sheet in accordance with the present invention are as follows:

*Example I*

Apparatus is set up in accordance with FIGURE 1 of the drawing wherein both the enclosure and the plates are composed of commercial graphite. The cover is affixed to the lower body portion and the chamber atmosphere is reduced to a pressure of 0.010 mm. of mercury by the pump. Power is supplied to the induction coil which heats the enclosure, plates and passages to an uncorrected optical pyrometer temperature reading of about 1775° C.

Boron trichloride in gaseous form is supplied at a rate of 0.05 cubic feet per hour through the feed line to the enclosure. A second feed line supplies ammonia at a rate of 0.28 cubic feet per hour to the enclosure. These gases are mixed in the heated enclosure. The gases are formed into a vapor in the enclosure which vapor is deposited uniformly as boron nitride on both the plates and on the interior enclosure wall as it flows through the enclosure chamber data pressure of approximately 0.3 mm. of mercury. Under the above conditions, a pyrolytic boron nitrile body of 3 mil thickness is formed on each surface of each plate after about 30 minutes. However, it is desired to provide a plurality of sheets of uniform thickness from this body. Accordingly, the above conditions are maintained for a period of about 30 minutes to produce a first 3 mil thick pyrolytic boron nitride layer. The gases supplied to the enclosure are then cut off and methane gas is supplied through a feed line at a rate of 0.25 cubic feet per hour and at a pressure of 900 microns to the enclosure thereby depositing carbon on the boron nitride layer to form an alternate layer of pyrolytic carbon with different properties. The methane gas is discontinued after 30 minutes during which 3 mils of pyrolytic carbon is deposited and the initial gases at their initial rates are supplied to the enclosure for an additional 30 minutes to produce another 3 mil thick pyrolytic boron nitride layer. This procedure is continued for approximately 330 minutes during which 6 pyrolytic boron nitride layers of 3 mil thickness each are produced with an alternate pyrolytic carbon layer with different properties between adjacent pyrolytic boron nitride layers. The power and gas flow are then discontinued on the chamber's restored atmosphere pressure.

After cooling to room temperature, the chamber cover is removed. The plates, which are coated with a laminated body on both sides are removed from the enclosure. The laminated body is removed from each surface of each sheet and has a thickness of about 33 mils.

A 3 inch square segment of one of these laminated bodies, which has a thickness of 33 mils, is placed in a container with an intercalation material consisting of a sufficient amount of concentrated sulphur acid to which has been added a small non-critical amount of nitric acid to immerse the body completely therein. The body is immersed in this solution for a sufficient period of time until the intercalation material is inserted in the alternate layers. After insertion of the intercalation material, the boron nitride layers separate partially. Therefore, it is not necessary to provide a specific time period. The body is then removed from the solution and the layers of pyrolytic boron nitride, which are of 3 mil thickness each, are readily separated one from the other into pyrolytic boron nitride sheets. After the separation, the individual sheets are washed with distilled water and dried.

The above body produced in accordance with this example provides 6 sheets of pyrolytic boron nitride material which are 3 mil thick each.

*Example II*

Apparatus is set up in accordance with FIGURE 1 of the drawing wherein both the enclosure and the plates are composed of commercial graphite. The cover is affixed to the lower body portion and the chamber atmisphere is reduced to a pressure of 0.008 mm. of mercury by the pump. Power is supplied to the induction coil which heats the enclosure, plates and passages to an uncorrected optical pyrometer temperature reading of about 1800° C. Boron trichloride in gaseous form is supplied at a rate of 0.25 cubic foot per hour through the feed line to the enclosure. A second feed line supplies ammonia at a rate of 0.52 cubic foot per hour to the enclosure. These gases are mixed in the heated enclosure. These gases are formed into a vapor in the enclosure which vapor is deposited uniformly as boron nitride on both the plates and on the interior enclosure wall as it flows through the enclosure chamber data pressure of approximately 0.3 mm. of mercury. Under the above conditions, a pyrolytic boron nitride body of 5 mil thickness is formed on each surface of each plate after about 15 minutes. However, it is desired to provide a plurality of sheets of uniform thickness from this body. Accordingly, the above conditions are maintained for a period of about 15 minutes to produce a first 5 mil thick pyrolytic boron nitride layer. The gases supplied to the enclosure are then cut off for a period of several minutes and the temperature is reduced to 1000° C. Ammonia is supplied through a feed line at a pressure of 0.3 mm. of mercury to the enclosure while aluminum trichloride is fed through a second feed line to the enclosure from a boiler maintained at a temperature of 70° C. thereby depositing aluminum nitride on the boron nitride layer to form an alternate layer of aluminum nitride with different properties. These gases are then discontinued after 30 minutes during which 3 mils of aluminum nitride is deposited and the initial gas at their initial rates are supplied to the enclosure for an additional 15 minutes to produce another 5 mil thick pyrolytic boron nitride layer. This procedure is continued for approximately 265 minutes during which 6 pyrolytic boron nitride layers of 5 mil thickness each are produced with an alternate aluminum nitride layer with different properties between adjacent pyrolytic boron nitride layers. The power and gas flow are then discontinued on the chamber's restored atmosphere pressure.

After cooling to room temperature, the chamber cover is removed. The plates, which are coated with laminated body on both sides are removed from the enclosure. The laminated body is removed from each surface of each sheet and has a thickness of about 45 mils.

A 3 inch square segment of one of these laminated bodies, which has a thickness of 45 mils, is placed in a container with sodium hydroxide to immerse the body completely therein. The body is immersed in this solution for a sufficient period of time until the boron nitride layers are separate by dissolving chemically of the alternate layers of aluminum nitride. Therefore, it is not necessary to provide a specific time period. The body is then removed from the solution and the layers of pyrolytic boron nitride, which are of 5 mil thickness each, are readily separated one from the other into pyrolytic boron nitride sheets. After the separation, the individual sheets are washed with distilled water and dried.

The above body produced in accordance with this example provides 6 sheets of pyrolytic boron nitride material which are 5 mil thick each.

While other modifications of this invention and variations of method which may be employed in the scope of the invention have not been described, the invention is intended to include such that may be embraced within the following claims.

What I claim as new and desire to secure by Letters Patent of the United States is:

1. A method of forming a sheet which comprises providing a body with a plurality of generally parallel pyrolytic boron nitride layers, and with an alternate layer of material having different properties from pyrolytic boron nitride located between each pair of adjacent pyrolytic boron nitride layers said material being non-reactive with the pyrolytic boron nitride and permitting the penetration of intercalation material in fluid form into the body thereof, contacting said body with intercalation material in fluid form, said intercalation material being selected from the group consisting of an electron acceptor material with high electron affinity and an electron donor material with a low ionization potential, whereby said intercalation material enters said alternate layers decreasing the strength thereof and thereby decreasing the continuity between said pyrolytic boron nitride layers, and separating said boron nitride layers as sheets.

2. A method of forming a sheet which comprises depositing a layer of pyrolytic boron nitride, depositing an alternate layer of material having different properties from pyrolytic boron nitride on said pyrolytic boron nitride layer, depositing subsequent pyrolytic boron nitride and alternate layers to form a body, said material being non-reactive with the pyrolytic boron nitride and permitting the penetration of intercalation material in fluid form into the body thereof, contacting said body with intercalation material in fluid form, said intercalation material being selected from the group consisting of an electron acceptor material with high electron affinity and an electron donor material with a low ionization potential, whereby said intercalation material enters said alternate layers decreasing the strength thereof and thereby decreasing the continuity between said pyrolytic boron nitride layers, and separating said boron nitride layers as sheets.

3. The method of forming a sheet substantially as recited in claim 1 wherein each alternate layer is a layer of pyrolytic graphite.

References Cited by the Examiner
UNITED STATES PATENTS

| | | | |
|---|---|---|---|
| 2,832,672 | 4/1958 | Fetterley et al. | 23—191 |
| 2,865,715 | 12/1958 | Kamlet | 23—191 |

OSCAR R. VERTIZ, Primary Examiner.

J. J. BROWN, Assistant Examiner.